United States Patent
Bae et al.

(10) Patent No.: US 9,107,039 B2
(45) Date of Patent: Aug. 11, 2015

(54) APPARATUS AND METHOD FOR SWITCHING MODE IN A LOCATION BASED SERVICE SYSTEM USING VISIBLE LIGHT COMMUNICATION

(71) Applicant: Samsung Electronics Co., Ltd., Gyeonggi-do (KR)

(72) Inventors: Tae-Han Bae, Gyeonggi-do (KR); Eun-Tae Won, Seoul (KR); Jae-Seung Son, Gyeonggi-do (KR); Do-Young Kim, Gyeonggi-do (KR)

(73) Assignee: Samsung Electronics Co., Ltd. (KR)

(*) Notice: Subject to any disclaimer, the term of this patent is extended or adjusted under 35 U.S.C. 154(b) by 0 days.

(21) Appl. No.: 14/321,448

(22) Filed: Jul. 1, 2014

(65) Prior Publication Data

US 2014/0314421 A1 Oct. 23, 2014

Related U.S. Application Data

(63) Continuation of application No. 13/669,888, filed on Nov. 6, 2012, now Pat. No. 8,798,912, which is a continuation of application No. 12/831,561, filed on Jul. 7, 2010, now Pat. No. 8,332,139.

(30) Foreign Application Priority Data

Jul. 7, 2009 (KR) .......................... 10-2009-0061505

(51) Int. Cl.
*G01C 21/00* (2006.01)
*H04W 4/02* (2009.01)
*G01C 21/20* (2006.01)
(Continued)

(52) U.S. Cl.
CPC ................. *H04W 4/02* (2013.01); *G01C 21/00* (2013.01); *G01C 21/206* (2013.01); *H04B 10/116* (2013.01); *H04B 10/1149* (2013.01)

(58) Field of Classification Search
CPC ... H04W 4/02; H04B 10/1149; H04B 10/116; G01C 21/20; G01C 21/206
USPC .......... 701/36, 408, 409, 410, 420, 433, 434, 701/451, 461; 398/151; 362/253, 276, 458
See application file for complete search history.

(56) References Cited

U.S. PATENT DOCUMENTS

| | | | |
|---|---|---|---|
| 7,970,537 B2 | 6/2011 | Ann et al. | |
| 8,498,811 B2 * | 7/2013 | Lundquist et al. | ............ 701/434 |
| 8,510,033 B2 * | 8/2013 | Park et al. | ...................... 701/409 |

(Continued)

FOREIGN PATENT DOCUMENTS

| | | |
|---|---|---|
| KR | 1020080100093 | 11/2008 |
| KR | 1020090065815 | 6/2009 |

(Continued)

*Primary Examiner* — David H Bollinger
(74) *Attorney, Agent, or Firm* — The Farrell Law Firm, P.C.

(57) ABSTRACT

A method and a lighting device for providing a Location Based Service (LBS) service providing a Location Based Service (LBS) based on Visible Light Communication (VLC) is provided. The method includes receiving, by at least one light source, data from a coordinator, the data including identification information of the at least one light source that corresponds to location information of the at least one light source, which is used by a terminal to identify a location of the at least one light source; and transmitting, by the at least one light source, the data to the terminal in a VLC signal.

21 Claims, 7 Drawing Sheets

(51) Int. Cl.
*H04B 10/114* (2013.01)
*H04B 10/116* (2013.01)

(56) References Cited

U.S. PATENT DOCUMENTS

2006/0044652 A1 3/2006 Yamamoto
2008/0281515 A1 11/2008 Ann et al.
2009/0157309 A1 6/2009 Won et al.
2009/0171571 A1 7/2009 Son et al.
2009/0210203 A1 8/2009 Won et al.

FOREIGN PATENT DOCUMENTS

| KR | 1020090073715 | 7/2009 |
| KR | 1020090088715 | 8/2009 |
| KR | 1020100059194 | 6/2010 |

* cited by examiner

APPARATUS AND METHOD FOR SWITCHING MODE IN A LOCATION BASED SERVICE SYSTEM USING VISIBLE LIGHT COMMUNICATION

PRIORITY

This application is a Continuation Application from U.S. patent application Ser. No. 13/669,888, filed in the U.S. Patent and Trademark Office on Nov. 6, 2012, which is a Continuation Application of U.S. Ser. No. 12/831,561, which was filed in the United States Patent and Trademark Office on Jul. 7, 2010, and claims priority under 35 U.S.C. §119(a) to a Korean Patent Application filed in the Korean Intellectual Property Office on Jul. 7, 2009 and assigned Serial No. 10-2009-0061505, the contents of each of which are incorporated herein by reference.

BACKGROUND OF THE INVENTION

1. Field of the Invention

The present invention relates generally to a Location Based Service (LBS) system, and more particularly, to an apparatus and method for switching modes in an LBS system based on Visible Light Communication (VLC).

2. Description of the Related Art

VLC refers to a wireless communication technology based on the light in a visible wavelength range, which performs wireless communication using visible radio waves. VLC is a communication scheme capable of replacing existing communication schemes based on Radio Frequency (RF), and intensive research thereon is now underway, which has coincided with the increased use of Light Emitting Diodes (LEDs). In common VLC, a transmitter sends visible light by using an LED or a Laser Diode (LD), color and illumination of which are controllable, as light sources, while a receiver processes the visible light using a Photo Detector (PD), thereby achieving VLC.

Utilization of VLC can be expanded to various existing RF-based services. An example may include Location Based Service (LBS) services that provide useful information to users considering the geographical locations where the users are currently located. LBS services may include public safety services, location tracking services, navigation services, information-providing services, etc., and in order to provide these LBS services, it is essential to identify the locations of users.

These services, which measure locations of users or terminals or obtains information about the locations, are called positioning services, for which media, such as radio waves and light, can be used. In the case of outdoor environments, a navigation system, which supports a positioning service using Global Positioning System (GPS) signals, can be considered the most typical LBS system. The GPS signals, however, occasionally may not be received in indoor environments, whereas VLC can be used even in indoor environments where the use of RF is limited. With the growth of skyscrapers, underground malls and large shopping malls, the positioning service needs to be provided in these indoor environments.

To furnish a VLC-based LBS system in the indoor environments described above, how to configure lighting devices and terminals is important. In an LBS system using lighting infrastructure, several service scenarios may exist depending on configurations of the lighting devices and the terminals. For example, VLC between a lighting device capable of supporting only transmission and a terminal capable of supporting both transmission and reception is inefficient. Even though the lighting device can support only transmission, the terminal sends a request for location information to the lighting device. In this case, it is preferable that after recognizing that the lighting device can support only transmission, the terminal inactivates (disables) a transmit mode and operates only in a receive mode. Therefore, it is necessary to define service modes fitting several possible service scenarios according to the transmission/reception availability of the lighting device, the transmission/reception availability of the terminal, and the use/nonuse of the existing RF communication.

SUMMARY OF THE INVENTION

An aspect of the present invention is to address at least the above-mentioned problems and/or disadvantages and to provide at least the advantages described below. Accordingly, an aspect of the present invention is to provide a mode switching apparatus and method for enabling operation in modes optimized for various service scenarios depending on the configurations of a lighting device and a terminal in a VLC-based LBS system.

In accordance with an aspect of the present invention, a coordinator for providing a Location Based Service (LBS) based on Visible Light Communication (VLC) is provided. The coordinator includes a controller for generating data to be transmitted to a transceiver, the data including identification information of at least one light source that corresponds to location information of the at least one light source, which is used by a terminal to identify a location of the at least one light source; and the transceiver for transmitting the data to the at least one light source.

In accordance with another aspect of the present invention, a method for providing a Location Based Service (LBS) based on Visible Light Communication (VLC) in a coordinator is provided. The method includes generating, by a controller, data to be transmitted to a transceiver, the data including identification information of at least one light source that corresponds to a location information of the at least one light source, which is used by a terminal to identify a location of the at least one light source; and transmitting, by the transceiver, the data to the at least one light source.

In accordance with another aspect of the present invention, a method for performing a Location Based Service (LBS) in a terminal based on Visible Light Communication (VLC) is provided. The method includes receiving data using a visible light signal from a transmission device, wherein the data includes identification information of the transmission device; determining a location corresponding to the identification information of the transmission device; and displaying the determined location on a map.

In accordance with another aspect of the present invention, a terminal for providing a Location Based Service (LBS) based on Visible Light Communication (VLC) is provided. The terminal includes a controller for controlling to receive data using a visible light signal from a transmission device, to determine a location corresponding to identification information of the transmission device, and to display the determined location on a map, wherein the data includes identification information of the transmission device.

In accordance with another aspect of the present invention, a lighting device for providing a Location Based Service (LBS) based on Visible Light Communication (VLC) is provided. The lighting device includes at least one light source for receiving data from a coordinator, the data including identification information of the at least one light source that corresponds to location information of the at least one light source, which is used by a terminal to identify a location of the at least one light source, and transmitting the data to the terminal in a VLC signal.

In accordance with another aspect of the present invention, a method for providing a Location Based Service (LBS) based on Visible Light Communication (VLC) is provided. The method includes receiving, by at least one light source, data from a coordinator, the data including identification information of the at least one light source that corresponds to location information of the at least one light source, which is used by a terminal to identify a location of the at least one light source; and transmitting, by the at least one light source, the data to the terminal in a VLC signal.

BRIEF DESCRIPTION OF THE DRAWINGS

The above and other aspects, features and advantages of certain exemplary embodiments of the present invention will be more apparent from the following description taken in conjunction with the accompanying drawings, in which.

DETAILED DESCRIPTION OF EMBODIMENTS OF THE PRESENT INVENTION

Figure 1:
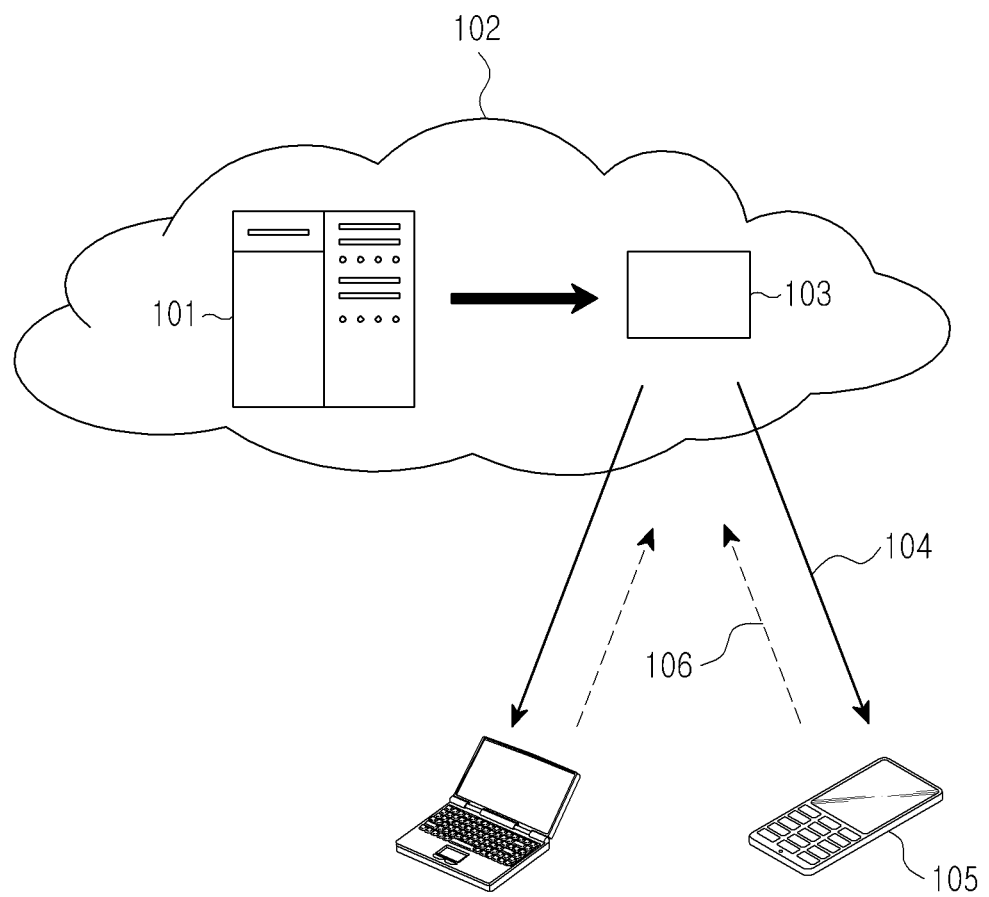
FIG. 1 is a diagram showing the configuration of a general VLC system.

Embodiments of the present invention will now be described in detail with reference to the accompanying drawings. It should be noted that throughout the drawings, the same drawing reference numerals will be construed to refer to the same elements, features and structures. In addition, descriptions of well-known functions and constructions are omitted for clarity and conciseness.

In the following description, the terms used in VLC will be used for convenience' sake, but it is not intended to limit the scope of the present invention to VLC and its terms, and embodiments of the present invention can be used in any communication system having a similar technical background, for example, an LBS system using infrared communication, terahertz communication, etc.

The present invention provides a method for automatically switching service modes in a VLC-based LBS system. Specifically, the present invention provides a method for defining service scenarios depending on the configurations of lighting devices and terminals constituting the LBS system, and switching to modes optimized for the defined service scenarios. Various service scenarios exist according to the transmission/reception availability of the lighting devices and the transmission/reception availability of the terminals. By doing so, users can conveniently use positioning services.

Before a description of the present invention is given, the VLC system used in the present invention will be briefly described. Referring to FIG. 1, a common VLC system includes at least one lighting device 103 and at least one terminal 105 for performing data transmission/reception with the lighting device 103. The lighting device 103, which is comprised of LEDs or LDs, serves as lighting and performs data transmission/reception using visible light. The terminal 105 includes, for example, a cell phone, a PDA and a desktop computer. In addition, the lighting device 103 may be part of a network 102 by being combined with an external content server 101, thereby more efficiently implementing the VLC system. However, the network connection is not necessarily required in this system.

In the case of a unidirectional VLC system, the lighting device 103 can only transmit VLC signals (104), and should be able to transmit at least one of its Identifier (ID) and pre-stored simple information. If connected to the content server 101, the lighting device 103 may transmit data from the content server 101. This lighting device 103 may be mounted in a lamp using LEDs or LDs, such as electronic display boards, streetlamps, and traffic lights. However, in the case of a bidirectional VLC system, the terminal 105 may receive data, and send a request for desired data or transmit information (106). In addition, the lighting device 103 may transmit the data and receive the request from the terminal 105.

As described above, several possible service scenarios exist according to the transmission/reception capability of the lighting device, the transmission/reception capability of the terminal, and the connection with the content server. For example, if the lighting device has a reception function and the terminal has a transmission function, it will be more efficient for the terminal to actively switch to the transmit mode and send a data request, rather than to passively wait for data to be received from the lighting device in the receive mode. In this way, the terminal is required to check the current system configuration and automatically switch the mode depending on the checked system configuration.

The present invention suggests six (6) different service scenarios as service scenarios associated with configurations of the service system. Examples of these system configurations may be associated with service scenarios where a unidirectional VLC-enabled lighting device is included in the system as shown in FIGS. 2A to 2D, and other service scenarios where a bidirectional VLC-enabled lighting device is included in the system as shown in FIGS. 3A and 3B.

Figure 2A:
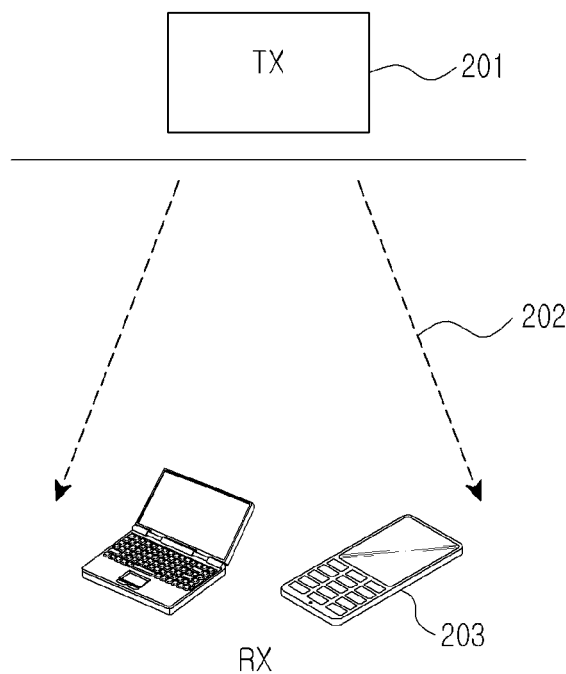
FIGS. 2A to 2D are diagrams showing examples of the configuration of a system including a unidirectional VLC-enabled lighting device according to an embodiment of the present invention.
Figure 3A:
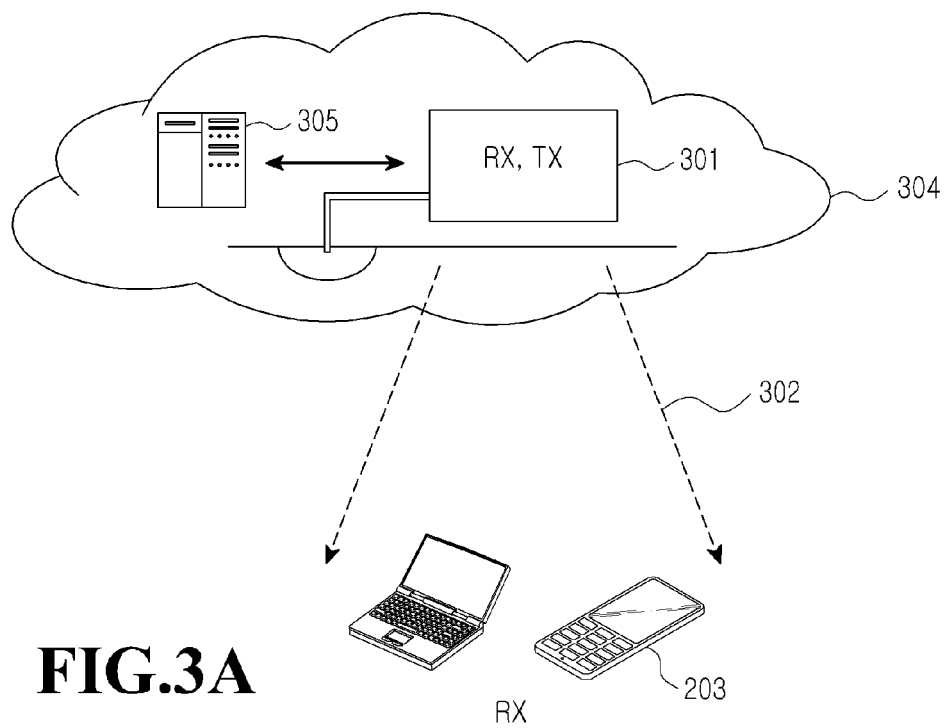
FIGS. 3A and 3B are diagrams showing examples of the configuration of a system including a bidirectional VLC-enabled lighting device according to an embodiment of the present invention.
Figure 3B:
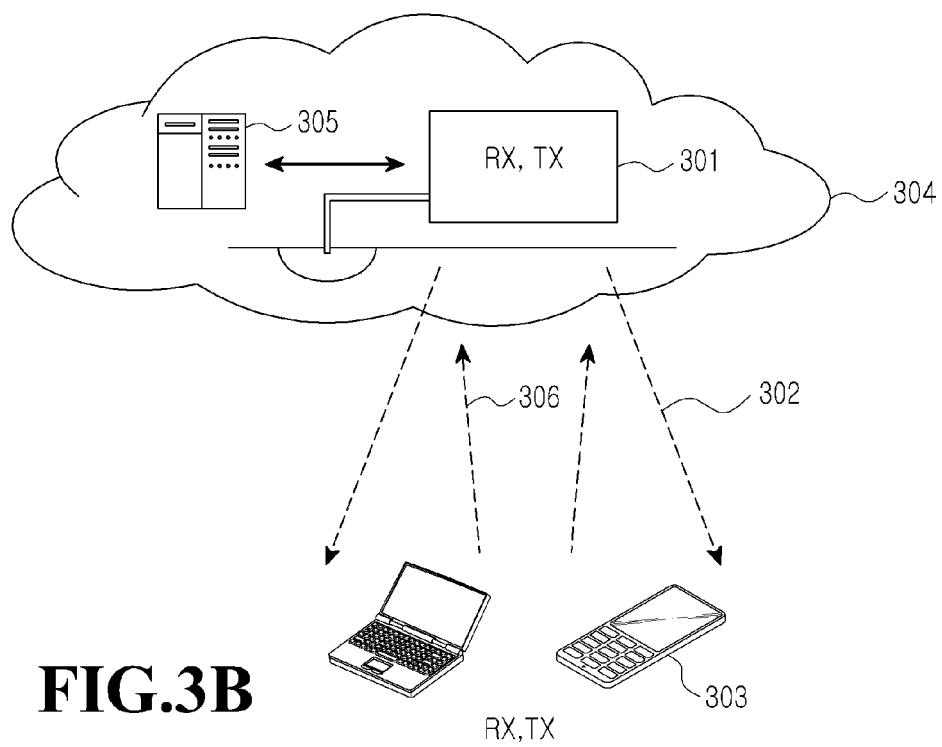

First, FIG. 2A shows the configuration of the simplest unidirectional VLC-based LBS system. This system includes a lighting device 201 with a VLC transmission module, and at least one terminal 203 with a VLC receiver. The lighting device 201 serves as lighting, and is used as a transmission device that transmits data. The lighting device 201 is greater than one in number, and transmits pre-stored data such as a unique ID of the lighting device, in the form of visible light (202).

The lighting device 201, connected to a content server (not shown), may receive data stored in the content server and forward it to the terminal 203.

Then the terminal 203 receives the data transmitted by the lighting device 201, and identifies its current location based on the received data. To be specific, the terminal 203 compares the received data with its map data for, for example, the inside of the building, and provides additional services associated with the current location or the location information requested by the user.

In this system configuration, the lighting device 201 continuously transmits only the pre-stored data (202), and the terminal 203 can only receive the transmitted data.

Figure 2B:
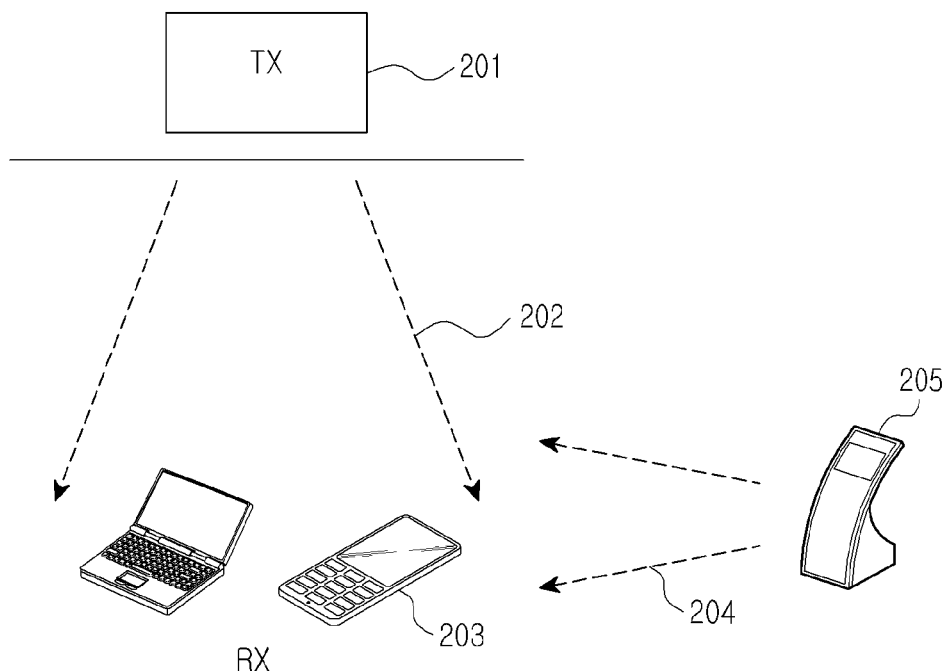

FIG. 2B shows a supplemented system configuration for the system shown in FIG. 2A, in which the terminal 203 is provided with the map data from a separate high-capacity transmission device 205 taking its limited data storage capacity into consideration. According to this system configuration, as the high-capacity transmission device 205, or an optical hot spot, separately transmits newly added data or map data to the user (204), the terminal 203 may easily collect the newly added data as well. The high-capacity transmission device 205 may transmit a large volume of information to the user without the lighting role that the lighting device 201 must consider.

Figure 2C:
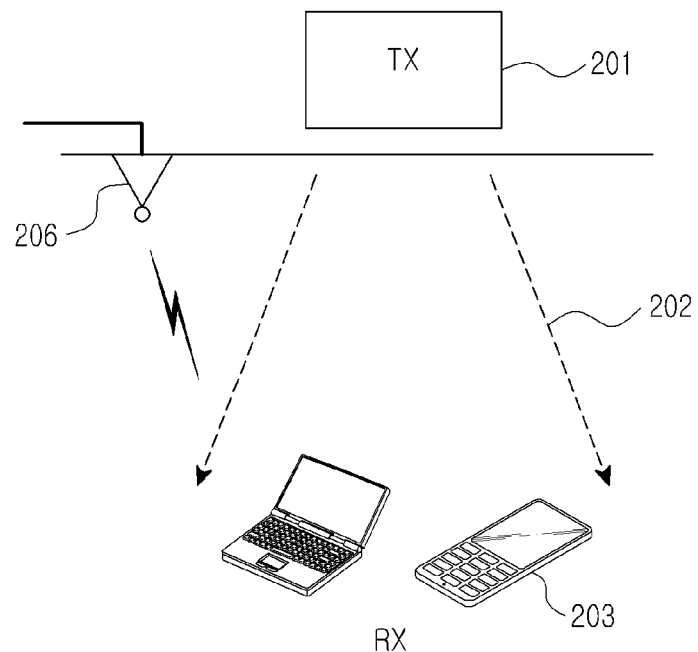

FIG. 2C shows a scenario in which when, like in FIGS. 2A and 2B, the lighting device 201 can support only transmission and the terminal 203 can support only reception, the terminal 203 is provided with additional data from a communication device, for example, a wireless Internet access device 206, in addition to the limited data from the lighting device 201. According to this hybrid system configuration, the lighting device 201 transmits data including Internet access information such as Uniform Resource Locators (URLs), and the terminal 203 may acquire the access information from the received data. By doing so, the terminal 203, as described above, not only can provide LBS services to the user but also can receive additional data by accessing the Internet using the access information.

Figure 2D:
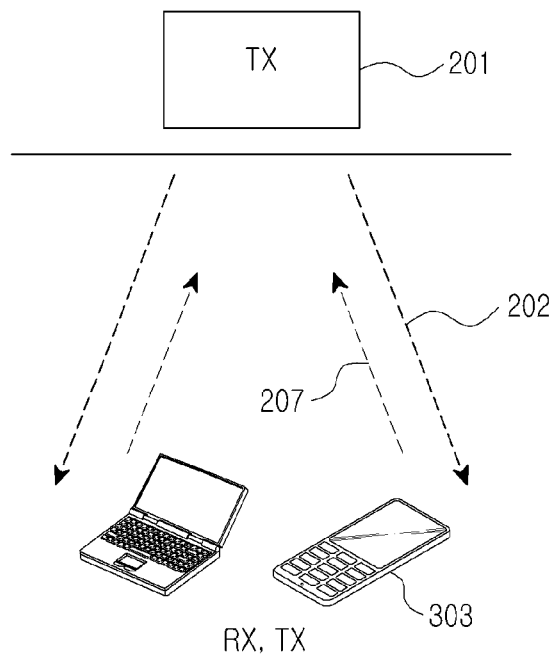

FIG. 2D shows the configuration of a unidirectional VLC-based LBS system, which is similar to that of FIG. 2A in terms of the services provided, except that in FIG. 2D, a terminal 303 further includes a VLC transmitter as well as the VLC receiver. In this system configuration, although the terminal 303 transmits a request to the lighting device 201 (207), the lighting device 201 cannot receive the request since it has no reception function. Thus, it is preferable for the terminal 303 to inactivate the transmit mode and operate only in the receive mode. Like in FIG. 2A, the terminal 303 in FIG. 2D may also compare the data transmitted (202) from the lighting device 201 with its map data, and provide LBS services to the user.

FIG. 3A shows the configuration of a bidirectional VLC-based LBS system in which a lighting device 301 has both a transmission module and a reception module. The lighting device 301 may be part of a network 304 by being connected to a content server 305, a description of which has been made above. The content server 305 may be omitted, since it is not an essential component. In FIG. 3A, the lighting device 301 has both the VLC transmission module and the VLC reception module, but the terminal 203 has only the reception function. In this case, the terminal 203 cannot send a data request to the lighting device 301. However, the lighting device 301 with a reception function does not start transmitting data before receiving the request. Thus, in this configuration of the system that cannot receive requests, interactive communication is not made. In this case, therefore, even though no data is transmitted from the lighting device 301, the terminal 203 may occasionally wait for data reception for a long time. To prevent this, it is preferable for the terminal 203 to utilize only the receive mode.

FIG. 3B shows configuration of a bidirectional VLC-based LBS system in which a lighting device 301 has both a VLC transmission module and a VLC reception module, and a terminal 303 also has both a VLC transmitter and a VLC receiver. The terminal 303 having a receiver can transmit a request for data desired by the user to the lighting device 301 (306). In response to the request received, the lighting device 301 forwards the received request to the server 305 over the network 304. The lighting device 301 receives data from the server 305 in response to the request, and provides the received data to the terminal 303 (302). In this way, the terminal 303 provides LBS services to the user based on the received data.

As described above, six different service scenarios are possible according to different configurations of the lighting devices and the terminals. A method for automatically switching to modes appropriate for these service scenarios is proposed as follows.

First, the operation modes of the lighting devices are as follows. If a lighting device has only a transmission module, the lighting device operates in a transmit mode for transmitting every time a unique ID for identifying the lighting device, pre-stored information, and a signal indicating that the lighting device is in a transmission-only lighting device. In contrast, if a lighting device has both a transmission module and a reception module, the lighting device selects a mode based on a request received from a terminal. Accordingly, the lighting device having both the transmission and reception modules operates in the transmit mode only when it receives a request from the terminal in the receive mode, in order to send a response to the request.

Meanwhile, a terminal recognizes the operation mode of a lighting device, and automatically switches its mode to be matched with the recognized operation mode. Specifically, the terminal determines whether the lighting device is a transmission-only lighting device, based on data transmitted from the lighting device, and based on the data, the terminal operates in a receive mode for receiving large-volume data such as map data, or additional data. If no visible light signal from the lighting device has been received for a long time, it is unnecessary for the terminal to continuously operate in the receive mode. Considering this, it is preferable for the terminal to exit the receive mode and interrupt the LBS service. Therefore, in the present invention, the terminal repeatedly determines whether a visible light signal has been received, for a predetermined time, and automatically stops the receive mode if there is no visible light signal received. In the case of a terminal having both a transmitter and a receiver, if there is no visible light signal received, it is preferable for the terminal to automatically switch to a transmit/receive mode in order to directly request data.

When a lighting device and a terminal exchange data in this manner, the lighting device and the terminal each having any one or both of a transmission function and a receiving function are required to operate in optimal modes to prevent unnecessary data transmission.

An operation in a terminal performed considering the aforementioned scenarios will be described with reference to FIGS. 4 and 5. A structure of the terminal is shown in FIG. 6, in which a VLC receiver 600 and a VLC transmitter 610 operate under the control of a controller 620. While the overall operation of the terminal, including mode switching, is controlled by the controller 620, it is assumed in FIGS. 4 and 5 that the control is made by the terminal for the sake of convenience.

First, reference will be made to FIG. 4 to describe an operation in a terminal that supports unidirectional communication by including only the VLC receiver 600 without the VLC transmitter 610 according to an embodiment of the present invention.

Figure 4:
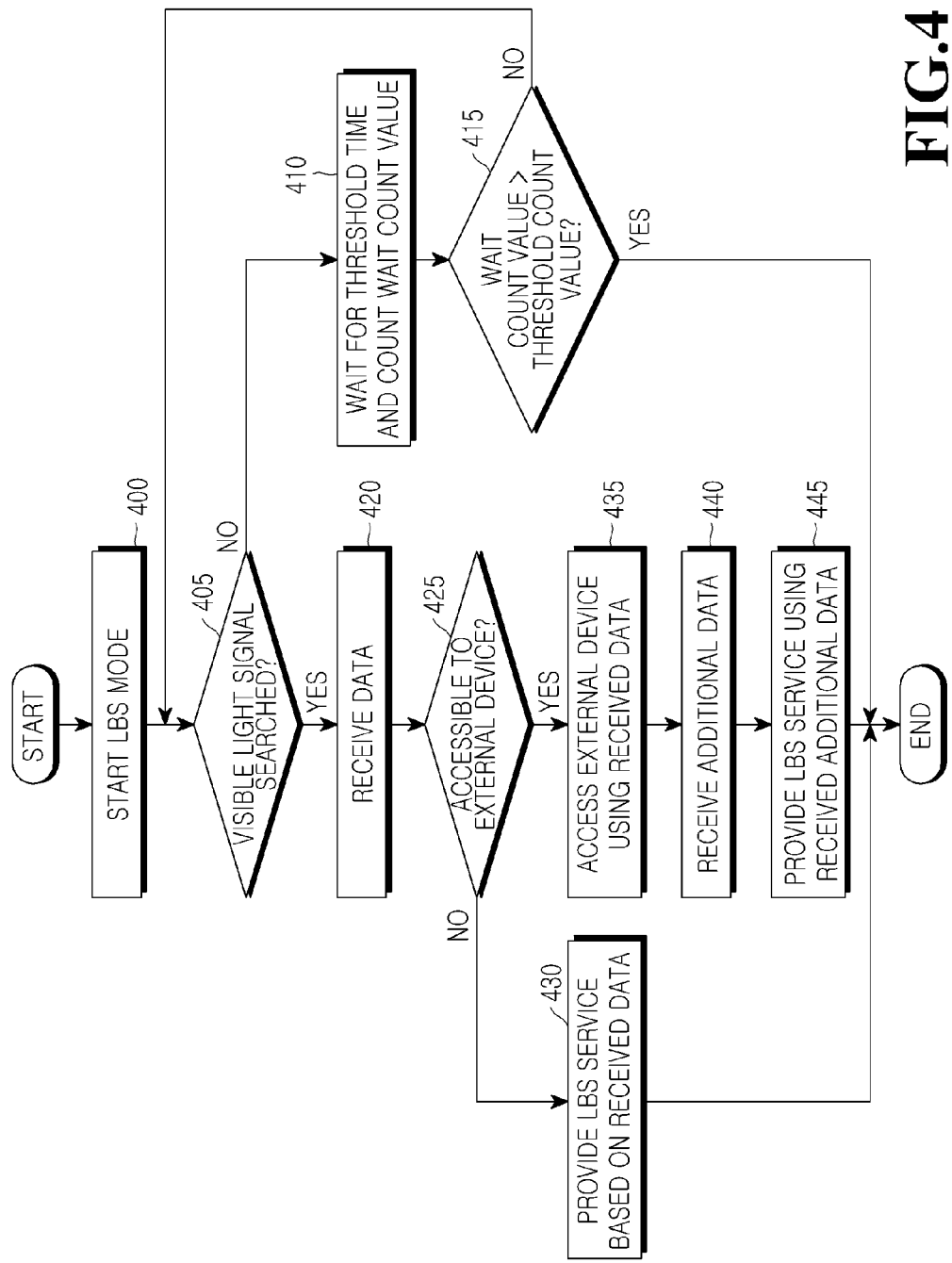
FIG. 4 is a flowchart showing an operation of switching modes in a unidirectional VLC-enabled terminal according to an embodiment of the present invention.

Referring to FIG. 4, if a user powers on the terminal and then requests start of an LBS service, an LBS mode starts in step 400. If the LBS mode starts, the terminal enters a search mode and determines in step 405 whether a visible light signal is received from the peripheral devices of the terminal. If a visible light signal is received in the search mode, the terminal receives data through the visible light signal from a lighting device in step 420. The received data includes a unique ID for identifying the lighting device, and if the lighting device has only a transmission module, the received data may further include data indicating that the lighting device is a transmission-only lighting device. Besides, the received data may include access information, e.g., a URL, needed to access an external device providing additional data.

In the unidirectional/bidirectional VLC using the lighting infrastructure, identification information, e.g., an ID, of the lighting device plays an important role in identifying the lighting device. Based on the lighting device ID, a location of the lighting device and correct location information of a terminal in the location of the lighting device can be identified. In providing specific data to a user who desires to store the data or requires the data, the lighting device identification information may become an important decision factor. The lighting device identification information is for an indoor positioning system during VLC services, and may be used in any place where the lighting infrastructures are installed, such as buildings and public facilities. Different lighting device identification information may be defined for different lighting devices.

In step 425, the terminal determines whether access to an external device is possible. The terminal may determine that access to an external device is possible, if access information is included in the received data. In contrast, if the received data from a lighting device includes only an ID of the lighting device, the terminal determines that access to an external device is not possible. In this case, the terminal provides the LBS service based on the received data in step 430. To be specific, the terminal identifies location information corresponding to an ID in the received data, determines the current location by comparing the location information with map information stored in the terminal, and displays a map image associated with the determined location. In other words, the terminal matches its current location to map information using the lighting device ID and displays the map information on a display. By doing so, the terminal can provide an LBS service associated with the location information requested by the user.

If access to an external device is possible in step 425, the terminal accesses the external device using the received data in step 435. The terminal receives additional data from the accessed external device in step 440, and provides the LBS service using the received additional data in step 445. By accessing the external high-capacity device in this way, the terminal may receive large-volume data and additional data as well, making it possible to provide differentiated LBS services to the user.

On the contrary, if no visible light signal is received in step 405, the terminal waits for a threshold time and counts the number of instances in which the wait time exceeds the threshold time (hereinafter referred to as a 'wait count value') in step 410. Thereafter, the terminal determines in step 415 whether the wait count value is greater than a threshold count value. If the wait count value is less than or equal to the threshold count value, the terminal returns to step 405 and repeats the search for a visible light signal. If no visible light signal has been received until the wait count value is greater than the threshold count value in step 415, the terminal stops the search for a visible light signal, terminating the LBS service.

As described above, since the unidirectional VLC-enabled terminal can only receive data from the lighting device or the external high-capacity device, the terminal operates in the receive mode. The present invention provides a method in which in order to prevent an unnecessary operation of continuously determining by the terminal whether a visible light signal is received, the LBS mode is automatically shut down if no visible light signal has been received even after a lapse of a predetermined time.

An operation in a bidirectional VLC-enabled terminal having both the VLC transmitter 600 and the VLC receiver 610 will be described with reference to FIG. 5.

Figure 5:
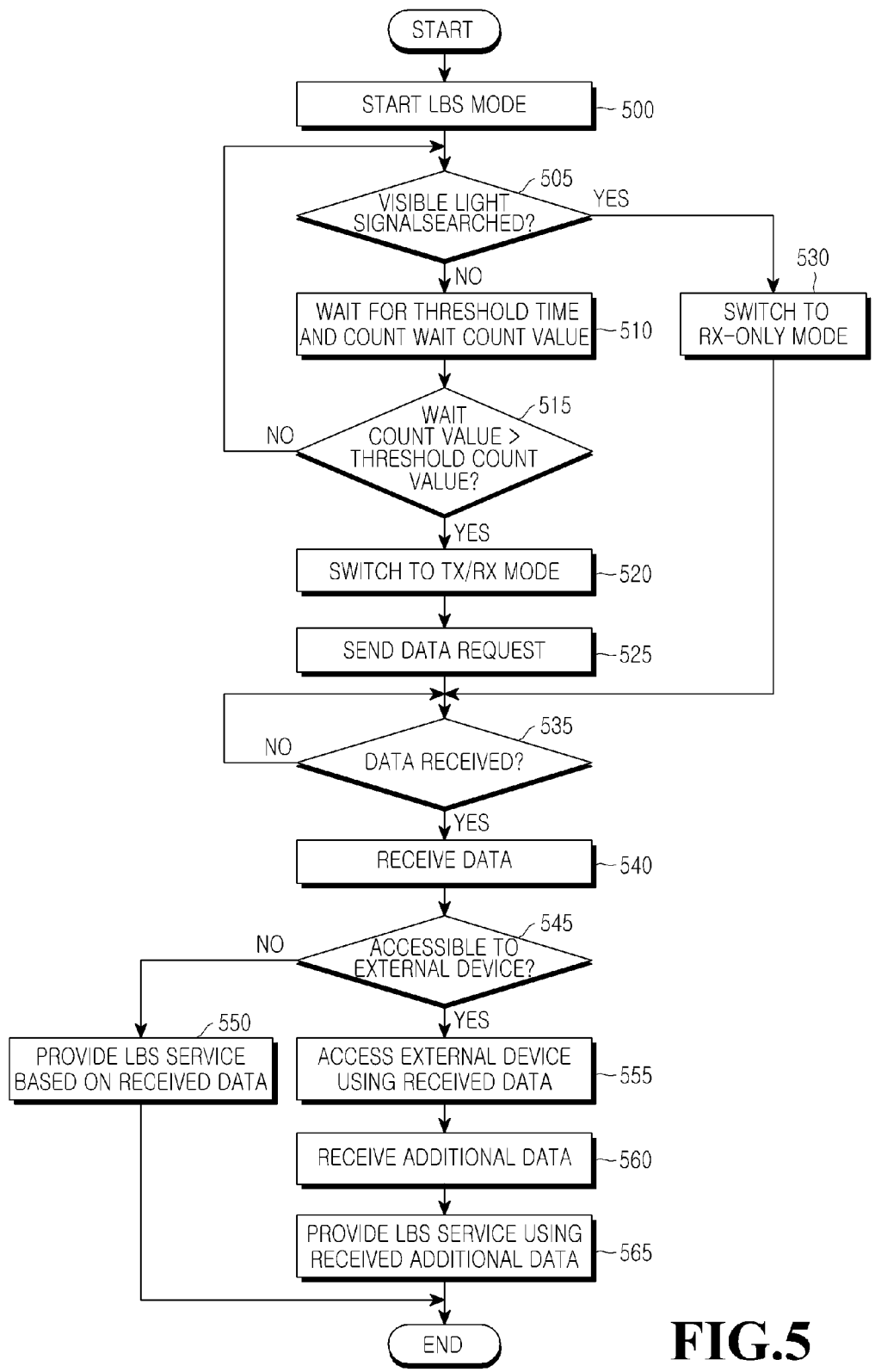
FIG. 5 is a flowchart showing an operation of switching modes in a bidirectional VLC-enabled terminal according to an embodiment of the present invention.
Figure 6:
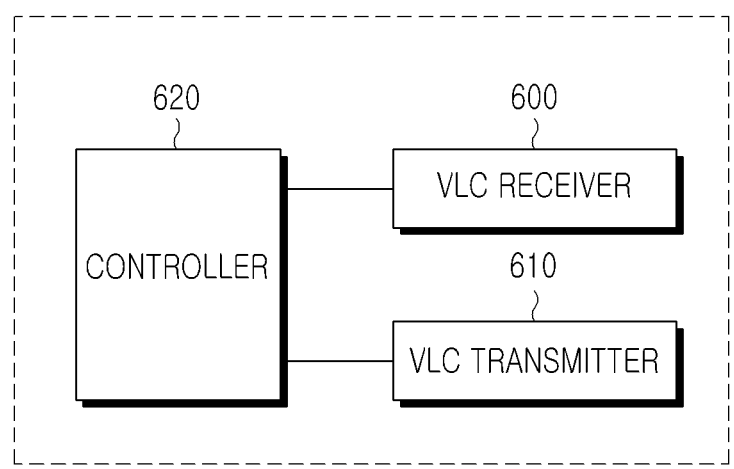
FIG. 6 is a block diagram showing an internal structure of a terminal according to an embodiment of the present invention.

Referring to FIG. 5, if an LBS mode starts in step 500, the terminal determines in step 505 whether a visible light signal is received. If a visible light signal is received, the terminal switches to a receive mode, or inactivates a transmit mode in step 530. If no visible light signal is received, the terminal, as in steps 410 and 415 of FIG. 4, repeatedly searches a predetermined number of times for a visible light signal for a predetermined time in step 510 and 515. If no visible light signal has been received until the wait count value exceeds the threshold count value, the terminal switches to a transmit/receive mode in step 520. At the same time, the terminal notifies the user of an immediate need for the user's request for the LBS service. Upon receiving a data request from the user in response to the notification, the terminal sends the lighting device a request for the data needed to perform the LBS service in step 525. If no visible light signal has been received until the wait count value exceeds the threshold count value, the terminal considers that the lighting device has not transmitted data because it includes both the transmission and reception modules. Therefore, rather than indefinitely waiting until data is received from the lighting device, the terminal switches to the transmit/receive mode to directly request data.

Accordingly, if a visible light signal is immediately received, the terminal having both the transmitter and the receiver operates in the receive-only mode and determines in step 535 whether data is received. However, if no visible light signal has been received even after the repeated search for a visible light signal, the terminal switches to the transmit/receive mode, directly requests data, and then determines in step 535 whether data is received in response to the request. In response to the request, the lighting device transmits lighting device identification information or pre-stored simple data, or fetches data from a server connected to the network and transmits it to the terminal. The lighting device may forward a data request from the terminal to the server, receive the requested data from the server, and transmit it to the terminal. A data reception-related operation in steps 540 to 565 is the same as that in steps 420 to 445 in FIG. 4, so a description thereof is not repeated.

As described above, the lighting device transmits data indicating its operation mode along with its ID, and the terminal automatically switches to an operation mode optimized to receive the data.

The aforementioned mode switching method and apparatus may be applied to any LBS systems that use not only the just VLC, but also terahertz communication and the like, including infrared communication, for example, which uses light in an invisible band, like VLC.

According to embodiments of the present invention, it is possible to automatically switch to modes fitting service scenarios defined depending on configurations of lighting devices and terminals in the VLC-based LBS system. As a result, operation modes of the positioning services are automatically switched depending on the VLC transmission/reception functions of the users' terminals, thereby providing convenience to the users.

While the present invention has been shown and described with reference to certain embodiments thereof, it will be understood by those skilled in the art that various changes in form and details may be made therein without departing from the spirit and scope of the invention as defined by the appended claims and their equivalents.

What is claimed is:

1. A coordinator for providing a Location Based Service (LBS) based on Visible Light Communication (VLC), comprising:
    a controller for generating data to be transmitted to a transceiver, the data including identification information of at least one light source that corresponds to location information of the at least one light source, which is used by a terminal to identify a location of the at least one light source; and
    the transceiver for transmitting the data to the at least one light source,
    wherein the transceiver receives a data request needed to perform the LBS from the terminal, and
    wherein the data includes at least one of information indicating that the at least one light source operates in a transmit mode and access information for a server providing additional data.

2. The coordinator of claim 1, wherein the controller switches the at least one light source to a transmit mode, upon receiving a data request needed to perform the LBS from the terminal.

3. A method for providing a Location Based Service (LBS) based on Visible Light Communication (VLC) in a coordinator, comprising:
    generating, by a controller, data to be transmitted to a transceiver, the data including identification information of at least one light source that corresponds to a location information of the at least one light source, which is used by a terminal to identify a location of the at least one light source;
    transmitting, by the transceiver, the data to the at least one light source; and
    switching to a transmit mode, upon receiving a data request needed to perform the LBS, from the terminal,
    wherein the data includes at least one of information indicating that the at least one light source operates in a transmit mode and access information for a server providing additional data.

4. The method of claim 3, wherein the identification information of the at least one light source is used by the terminal to provide the LBS for the terminal by comparing location information corresponding to the identification information of the at least one light source with map information stored in advance.

5. A method for performing a Location Based Service (LBS) in a terminal based on Visible Light Communication (VLC), the method comprising:
    receiving data using a visible light signal from a transmission device, wherein the data includes identification information of the transmission device;
    determining a location corresponding to the identification information of the transmission device;
    displaying the determined location on a map; and
    determining whether the received data includes at least one of information indicating that the transmission device operates in a transmit mode and access information for a server providing additional data.

6. The method of claim 5, further comprising switching to a receive mode if the received data includes the information indicating that the transmission device operates in the transmit mode.

7. The method of claim 6, wherein switching to a receive mode comprises inactivating a VLC transmitter and switching to the receive mode, if the terminal includes both the VLC transmitter and a VLC receiver.

8. The method of claim 5, further comprising:
    accessing the server using the access information for the server, if the received data includes the access information for the server;
    acquiring additional data from the server; and
    providing the LBS using the acquired additional data,
    wherein the additional data includes at least one of the location of the transmission device corresponding to the identification information and information associated with the map.

9. The method of claim 5, further comprising:
    repeating a search operation for a visible light signal if the terminal includes both a VLC transmitter and a VLC receiver and no visible light signal has been received within a predetermined time;
    stopping the search operation for a visible light signal if a count for the repeated search operation is greater than a predetermined threshold count; and
    switching to the transmit mode or a receive mode after stopping the search operation for the visible light signal.

10. The method of claim 9, further comprising requesting the transmission device to transmit data needed to perform the LBS.

11. A terminal for providing a Location Based Service (LBS) based on Visible Light Communication (VLC), the terminal comprising:
    a controller for controlling to receive data using a visible light signal from a transmission device, to determine a location corresponding to identification information of the transmission device, to display the determined location on a map, and for determining whether the received data includes at least one of information indicating that the transmission device operates in a transmit mode and access information for a server providing additional data,
    wherein the data includes the identification information of the transmission device.

12. The terminal of claim 11, further comprising a VLC transmitter for sending the transmission device a request for data needed to perform the LBS.

13. The terminal of claim 12, wherein the controller switches to a receive mode if the received data includes the information indicating that the transmission device operates in the transmit mode.

14. The terminal of claim 13, wherein the controller inactivates the VLC transmitter and switches to the receive mode, if the terminal includes both the VLC transmitter and a VLC receiver.

15. The terminal of claim 11, wherein if the received data includes the access information for the server providing additional data, the controller accesses the server using the access information for the server, acquires additional data from the server, and provides the LBS using the acquired additional data.

16. The terminal of claim 12, wherein the controller repeats a search operation for a visible light signal if no visible light signal has been received within a predetermined time, and stops the search operation for a visible light signal and switches to the transmit mode or a receive mode if a count for the repeated search operation is greater than a predetermined threshold count.

17. The terminal of claim 16, wherein after switching to the transmit/receive mode, the controller transmits a request for data needed to perform the LBS to the transmission device through the VLC transmitter.

18. A lighting device for providing a Location Based Service (LBS) based on Visible Light Communication (VLC), comprising:
 at least one light source for receiving data from a coordinator, the data including identification information of the at least one light source that corresponds to location information of the at least one light source, which is used by a terminal to identify a location of the at least one light source, and transmitting the data to the terminal in a VLC signal,
 wherein the at least one light source receives a data request needed to perform the LBS from the terminal,
 wherein the data includes at least one of information indicating that the at least one light source operates in a transmit mode and access information for a server providing additional data.

19. The lighting device of claim 18, wherein the at least one light source transmits the data request to the coordinator, and wherein the coordinator generates the data in response to the data request.

20. A method for providing a Location Based Service (LBS) based on Visible Light Communication (VLC), comprising:
 receiving, by at least one light source, data from a coordinator, the data including identification information of the at least one light source that corresponds to location information of the at least one light source, which is used by a terminal to identify a location of the at least one light source;
 transmitting, by the at least one light source, the data to the terminal in a VLC signal; and
 receiving a data request needed to perform the LBS from the terminal,
 wherein the data includes at least one of information indicating that the at least one light source operates in a transmit mode and access information for a server providing additional data.

21. The method of claim 20, further comprising transmitting the data request to the coordinator, wherein the coordinator generates the data in response to the data request.

* * * * *